United States Patent
Koenen et al.

(10) Patent No.: US 8,817,817 B2
(45) Date of Patent: Aug. 26, 2014

(54) METHOD FOR ETHERNET POWER SAVINGS ON LINK AGGREGATED GROUPS

(75) Inventors: David J. Koenen, Round Rock, TX (US); Mike Chuang, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1374 days.

(21) Appl. No.: 12/121,523

(22) Filed: May 15, 2008

(65) Prior Publication Data

US 2008/0304519 A1    Dec. 11, 2008

Related U.S. Application Data

(60) Provisional application No. 60/942,238, filed on Jun. 6, 2007.

(51) Int. Cl.
*H04L 12/10* (2006.01)
(52) U.S. Cl.
CPC *H04L 12/10* (2013.01); *Y02B 60/33* (2013.01)
USPC ........................................ 370/468; 713/323

(58) Field of Classification Search
None
See application file for complete search history.

(56) References Cited

U.S. PATENT DOCUMENTS

| | | |
|---|---|---|
| 5,608,446 A | 3/1997 | Carr et al. |
| 2003/0058800 A1 | 3/2003 | Goodman et al. |
| 2003/0074464 A1 | 4/2003 | Bohrer et al. |
| 2007/0188154 A1 | 8/2007 | Fan et al. |
| 2007/0201380 A1* | 8/2007 | Ma et al. ........................ 370/254 |

* cited by examiner

*Primary Examiner* — Benjamin Lamont

(57) ABSTRACT

This invention provides the ability to significantly lower the power consumed by a group of Ethernet links when organized in a Link Aggregation Group. When the server or switch senses low bandwidth utilization across multiple links in the group, it will negotiate the transition of un-necessary links to a lower power state. When the bandwidth requirements increases, the algorithm will quickly re-establish links and distribute the Ethernet traffic across the multiple links when necessary.

16 Claims, 6 Drawing Sheets

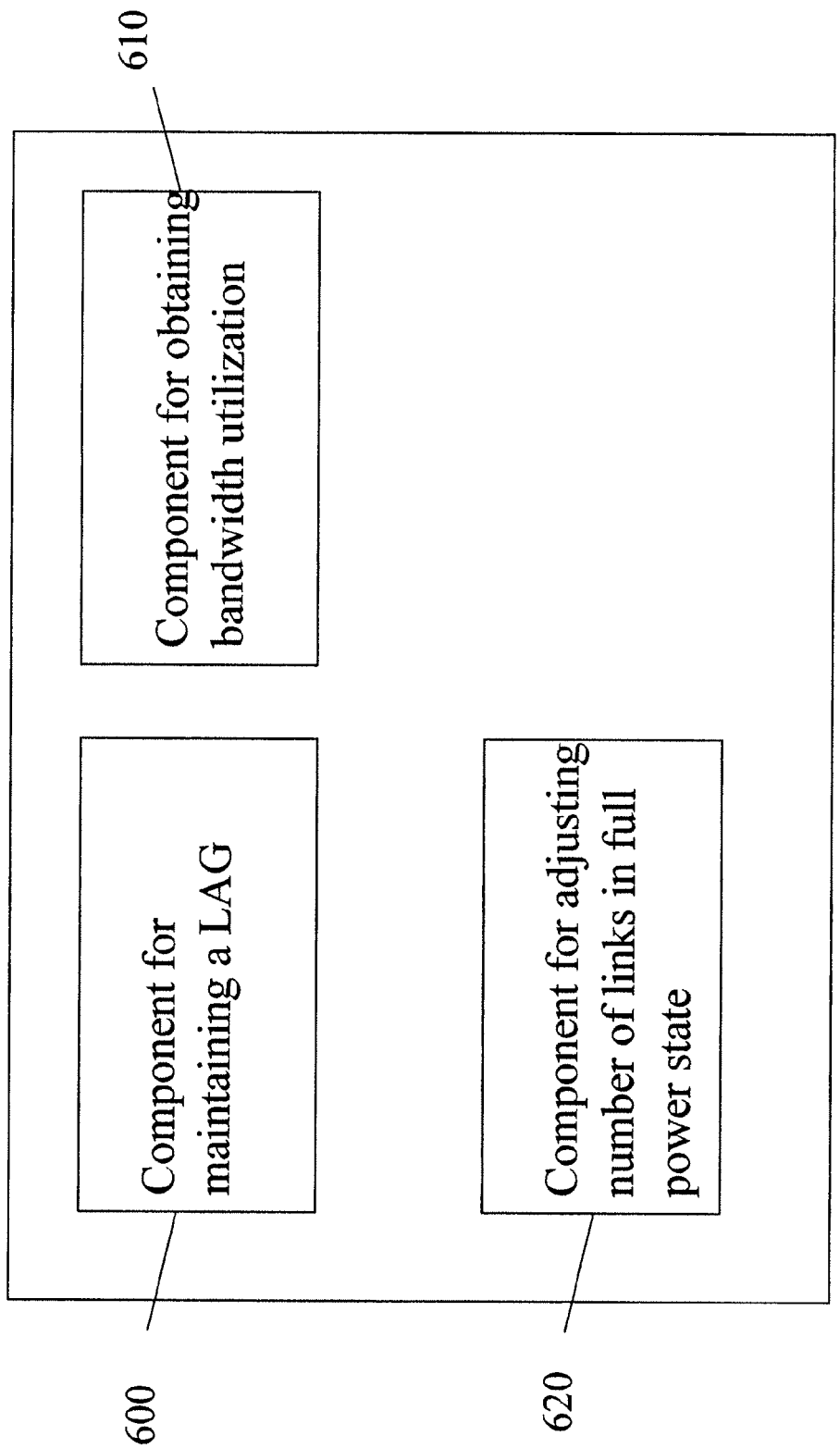

METHOD FOR ETHERNET POWER SAVINGS ON LINK AGGREGATED GROUPS

CROSS-REFERENCE TO RELATED PATENT APPLICATIONS

This application claims priority from Provisional Application U.S. Application 60/942,238, filed Jun. 6, 2007, incorporated herein by reference in its entirety.

FIELD OF THE INVENTION

The present invention relates generally to the field of Ethernet Link Aggregated Groups, and the utilization of methods, apparatuses and systems to introduce power saving on the Ethernet Link Aggregated Groups.

BACKGROUND OF THE INVENTION

Computers and switches consume electricity and power for under-utilized links. If a computer or switch requires more bandwidth or needs fail-over Ethernet Links, one possible solution is a Link Aggregation Group (LAG). The administrators of the network (often the Information Technology staff) aggregate several Ethernet links together into a Link Aggregation Group (LAG) as defined in the IEEE 802.3ad standards. By setting up a LAG and utilizing these standards, the network will seemingly run on what looks like a single Media Access Controller (MAC) that distributes and load balances the Ethernet packets between the set of links in the LAG.

There is a need in the art for a power saving capability for a group of Ethernet Links in a LAG. Currently, all the links in a LAG are in a full or near full power state. A need exists to have a more efficient usage of links in a LAG.

SUMMARY OF THE INVENTION

One embodiment of the invention relates to a system for conserving power in an Ethernet network, comprising a Link Aggregation Group that includes at least two Ethernet links, a bandwidth monitor for obtaining bandwidth utilization of the Link Aggregation Group, and a LAG adjuster for adjusting the number of Ethernet links in the Link Aggregation Group in a full power state based upon the bandwidth utilization obtained by a bandwidth utilization monitor.

Another embodiment of the invention relates to a method of conserving power in a Link Aggregation Group comprising monitoring bandwidth utilization of the Link Aggregation Group, comparing bandwidth utilization with available bandwidth, determining if the bandwidth utilization is lower than a threshold amount, and if bandwidth is lower than a threshold amount, adjusting a number of Ethernet links in the Link Aggregation Group in a full power state.

Another embodiment of the invention relates to a system for conserving power in an Ethernet network, comprising means for maintaining a Link Aggregation Group that includes at least two Ethernet links, and means for obtaining bandwidth utilization of the Link Aggregation Group, and means for adjusting the number of Ethernet links in the Link Aggregation Group in a full power state based upon the bandwidth utilization obtained by a bandwidth utilization monitor.

BRIEF DESCRIPTION OF THE DRAWINGS

FIG. 6 is a schematic diagram of the invention.

DETAILED DESCRIPTION OF THE PREFERRED EMBODIMENTS

Embodiments of the present invention will now be explained below with reference to the drawings.

In this invention, the term Ethernet is interpreted to be read broadly and to encompass local area networks and the protocols and standards utilized in such local area networks. In the Ethernet realm, when one wants to get more bandwidth or a wider data pipe between resources, one can aggregate multiple links such as Ethernet cables, and form a virtual larger connection that looks like a single connection to the receiver through a switch of Network Interface Card (NIC). This virtual larger connection of aggregated links is called a Link Aggregation Group (LAG), and can exist from one switch to another, from a NIC to a switch, to name a few. This aggregation can be done in software or implemented in hardware. Load balancing data across the aggregated link, an algorithm is utilized based upon information placed existing in the headers of the Ethernet packets sent across the links to select one of the multiple links. Often, if a system is not fully utilized, fewer links could be used, placing the remaining links in a low power, standby mode. The usage of all of the links in the LAG may only occur for peak loads (i.e. max loads, peak time of web surfing, backup, etc.)

The invention presents in one embodiment a green conscious solution for providing energy savings across an Ethernet Link Aggregated Group. Specifically, the invention enables the usage of link aggregation in a more energy efficient way, by only using the number of links necessary to maintain the traffic across the aggregated link. Specifically, a link is removed or put in a low power state, and traffic is load balanced across the remaining links. This procedure is done iteratively, until either the traffic across the links necessitates the usage of all remaining full power links, or there is potentially only one link remaining that is in a full power state in the aggregated group.

Figure 1:
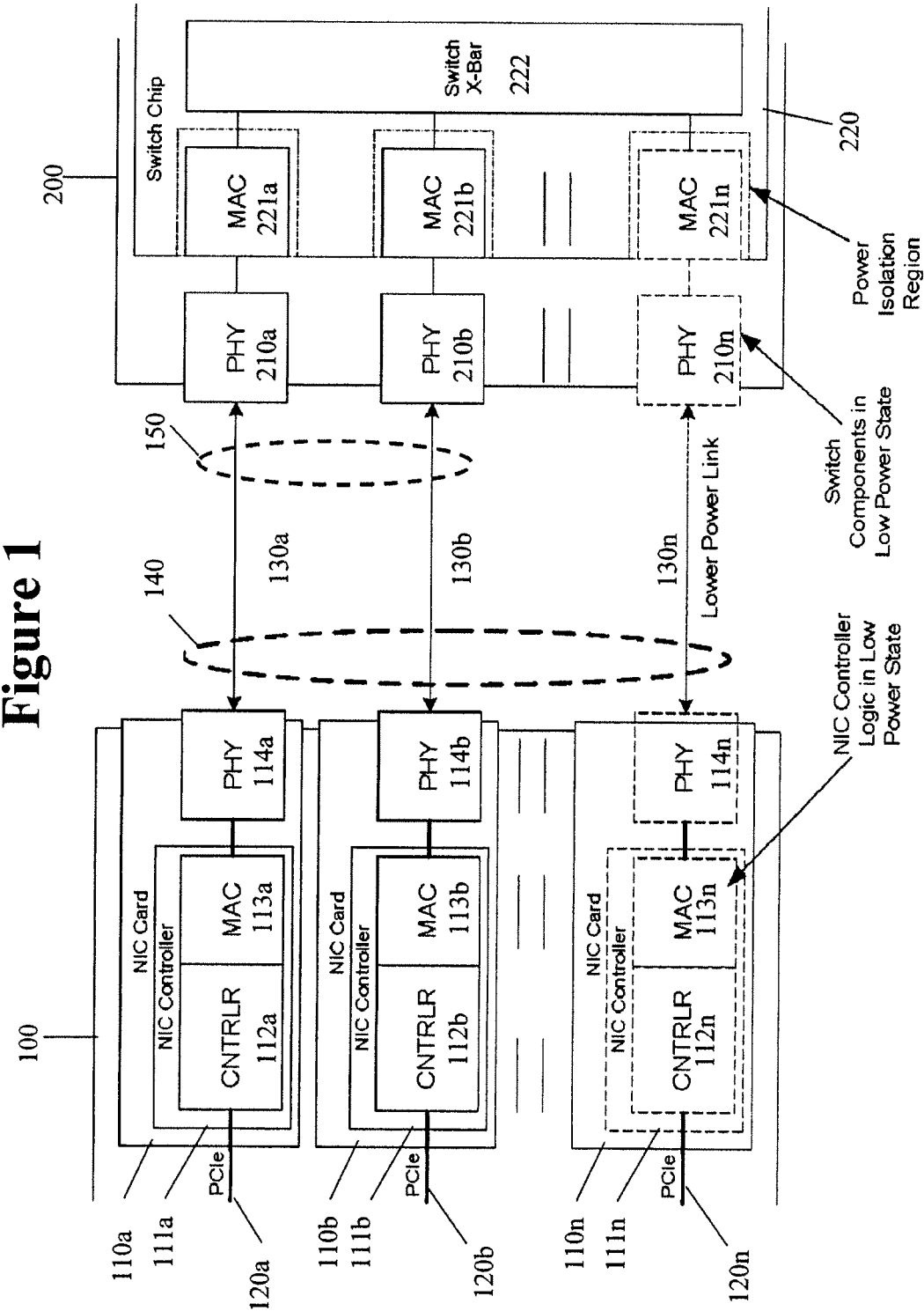
FIG. 1 is a schematic diagram of the invention.

Referring to FIG. 1, in one embodiment, a server 100 includes multiple Network Interface Cards (NICs) 110a, 110b and 110n. Each NIC card 110a, 110b and 110n communicates with the server 100 through a PCI bus 120a, 120b, 120n. In one embodiment, the PCI bus is a PCI-express bus. A NIC card 110a, 110b, and 110n in this embodiment contains a NIC controller 111a, 111b and 111n. A NIC controller 111a, 111b and 111n includes a controller (CNTRLR) 112a, 112b and 112n and a media access controller (MAC) 113a, 113b and 113n, which translates commands and instructions from the server 100.

The server 100 sends the commands and data across the PCI bus interface 120a, 120b and 120n to the CNTRLR 112a, 112b and 112n, which converts the information into appropriate packets for the MAC 113a, 113b and 113n and vice versa. The NIC card 110a, 110b and 110n also contains a PHY 114*a*, 114*b* and 114*n*, which is the physical interface that communicates with the cable (Ethernet link) 130*a*, 130*b* and 130*n*.

The cable 130*a*, 130*b* and 130*n* enables data transfer from the server 100 to a switch enclosure 200. The switch enclosure 200 in one embodiment includes a PHY 210*a*, 210*b* and 210*n*, which is the physical interface of the switch enclosure 200 that communicates with the cable 130*a*, 130*b* and 130*n*. The switch enclosure also includes a switch chip 220. The switch chip 220 includes a MAC 221*a*, 221*b* and 221*n* that translated the commands and instructions from the switch chip 200 to direct Ethernet packets from source to destination ports. The switch chip 220 also includes a switch crossbar (X-Bar) 222. Other types of switch architectures could also be utilized. The type of switch architecture utilized is not limiting on the invention. Further, other configurations of the server 100 and the switch enclosure 200 could be utilized. The configurations of these entities are not limiting on the invention. For example, this invention could be applied to any network equipment that utilizes IEEE803.ad link aggregation.

FIG. 1 shows that the cables 130*a*, 130*b* and 130*n* are joined in a Link Aggregation Group as described above. In one embodiment, all of the cables from the server 100 to the switch enclosure 200 are joined in a Link Aggregation Group 140 and are operating in a full power state.

In another embodiment, only certain links in the Link Aggregation Group 140 are operating in a full power state. In this embodiment, link 130*n* is placed in a low power state. Thus, a Low Power Link Aggregation Group 150, including links 130*a* and 130*b*. Further, the PHY components 210*n* and MAC 221*n* of the switch enclosure 200 could also be placed in a low power state. The components of the NIC card 110*n*, including the NIC controller 112*n* and the MAC 113*n*, could also be placed in a low power state. More details on placing components in a low power state in a Low Power Link Aggregation Group 150 will be described below.

Figure 2:
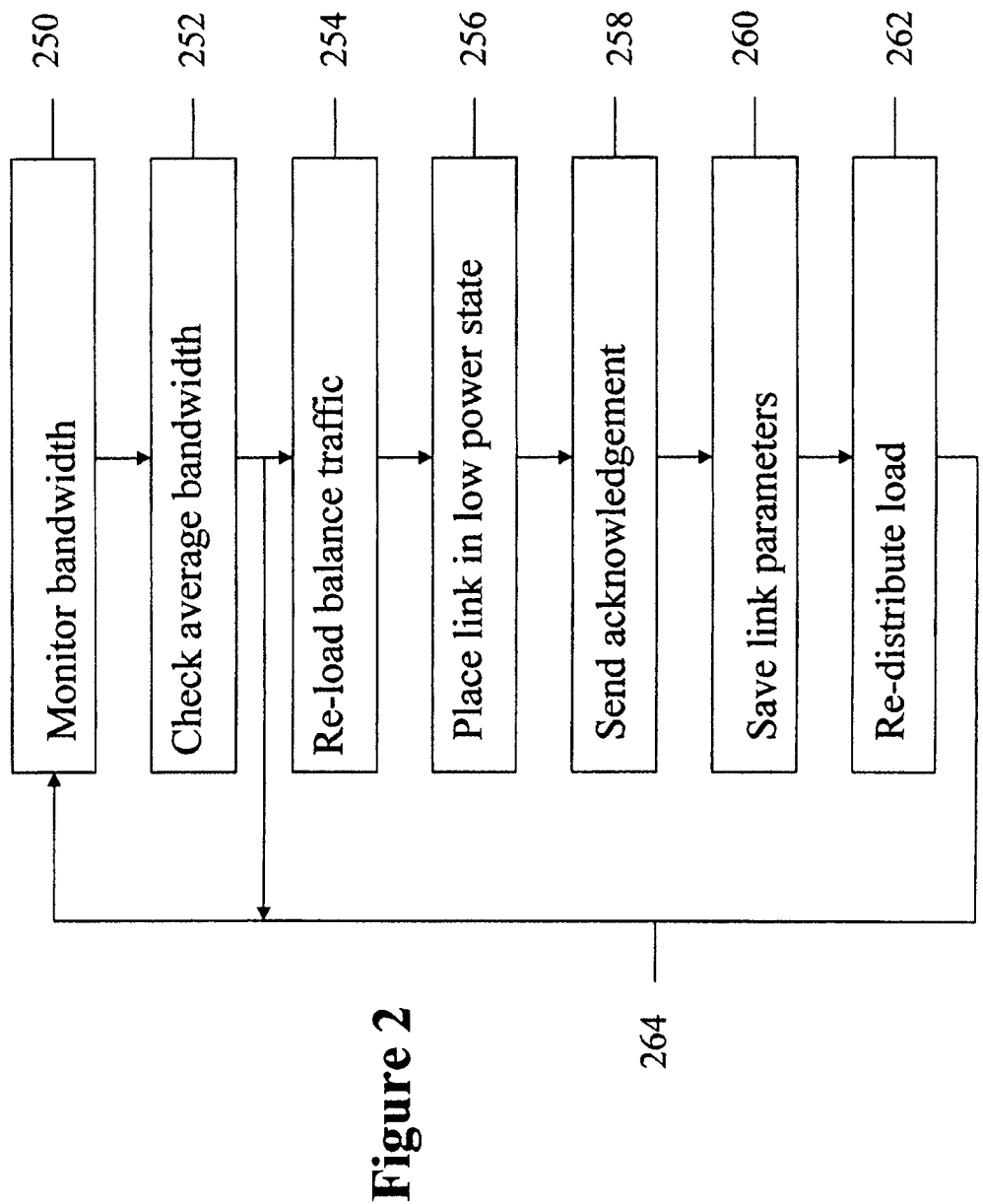
FIG. 2 is a flow chart that depicts an embodiment of the invention.

FIG. 2 depicts a flow chart that details one embodiment of a power saving embodiment of the invention. In this embodiment, a Low Power Link Aggregation Group is created and maintained. In one embodiment, the Link Aggregation Control Protocol (LACP) 802.3ad is extended to provide a new low power state to Network Interface Controllers (NICs) and Switch Ports. In this embodiment, either the switch or the NIC of the server could implement the power saving embodiment. For example, in one embodiment, the switch implements power savings on an Ethernet link. The switch could implement the power savings through the usage of hardware, firmware or software, in the form of a driver or control program that is executed by the switch. In this embodiment, the components of the server that correspond to that Ethernet link could be considered to be a link partner. In another embodiment, the server could implement power savings on an Ethernet link. The server could implement the power savings through the usage of hardware, firmware or software, in the form of a driver or control program that is executed by the server. In this embodiment, the components of the switch that corresponded to that link would be a link partner.

In step 250, in one embodiment, a control program of the switch is utilized to monitor the bandwidth utilization of a LAG that includes all of the links from one resource to another, for a total of N links in the LAG. In Step 252, a determination is made to check if the average or other algorithm computed on the bandwidth over a specified period of time is less than the aggregate bandwidth of N−1 links. If it is determined that the computed bandwidth is less than the aggregate bandwidth of N−1 links, then the control program requests (via an extension to LACP 802.3ad standards) to transfer the load-balanced traffic to the N−1 remaining links in step 254. Otherwise, control returns to step 252, in which the control program is utilized to monitor bandwidth utilization. In one embodiment, the control program may request to transfer the load-balanced traffic to a lesser amount of links if the computer bandwidth is less than a threshold amount, or if the computed bandwidth meets some other criterion. This determination is not limiting on the invention. In step 256, the control program places one of the links in the Link Aggregation Group into a low power, standby state. In this embodiment, the link or port could be placed in a "Standby" mode. Placing the link or port in such a mode could also comprise placing all of the components associated with that link or port in a low power or "Standby" state. In one embodiment, the link placed in a low power state is chosen randomly. In another embodiment, the link placed in a low power state may be a link that has utilized the least amount of bandwidth in the Link Aggregation Group. Other methods may be utilized to choose a link to place in a low power state. The method to choose a link to place in a low power state is not limiting on the invention.

In step 258, the link partner will also be monitoring its queues to evaluate the amount of data pending and the bandwidth necessary for this pending data. If its pending bandwidth is lower than the amount of bandwidth that N−1 NICs would be capable of communicating, then it will agree and send an acknowledgement (ack). In step 260, the MAC and PHY of the switch and server will save the necessary link parameters and registers to facilitate quickly bringing the link to an active state at a later time. After sending the acknowledgement, the link partner will proceed to re-distribute the load to the remaining links and then change the state of the idle link to a low power, standby state in step 262. The original requester will see the acknowledgement and lower the power of its idle link. As seen by the arrow 264, the control program will continue to monitor and adjust the number of links in a full power state until the average or another algorithm computed on the bandwidth has reached equilibrium of the available bandwidth from the number of links in an iterative fashion. In some embodiments, at least one link remains operational in a full power state in order to ensure that communication is enabled between the two resources. In another embodiment, hardware from the switch or NIC card, firmware, or any other suitable entity could be utilized in place of, or in conjunction with, the software control program.

Figure 3:
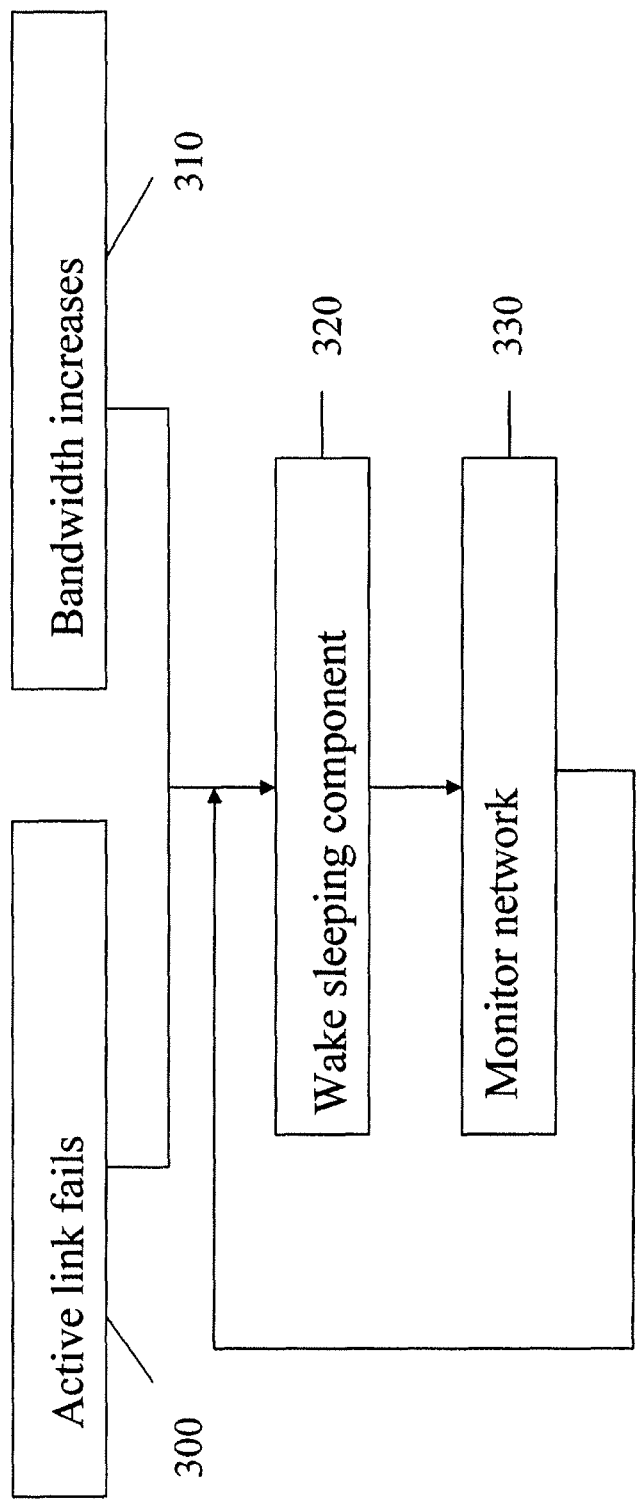
FIG. 3 is a flow chart that depicts an embodiment of the invention.

FIG. 3 depicts another power saving embodiment of the invention. FIG. 3 shows how to adjust a Low Power Link Aggregation Group. There are several situations in which a link in low power would need to be brought back into an active state. In step 300, an active link fails while one or more of the links is in a lower power state. A link failure could occur for a variety of reasons. The physical link may encounter mechanical issues, overheat, and so forth. In step 310, bandwidth increases, such that the bandwidth is higher than the current Low Power Link Aggregate Group can handle based upon the specification of the components in the Low Power LAG. In response to these situations, the control program will disable the failed link and awaken one of links in a low power, standby state and re-distribute a portion of the load-balance traffic to the re-awakened link. Specifically, in step 320, the Low Power LACP protocol allows one link partner (either from the server or switch side) to send a request to its link partner to request that it awakens its "sleeping" component and attach the standby link to its Aggregation Group. In other words, one link partner will request that the other link partner bring one or more of its components out of a low power state into a regular, full power, "selected" state. As shown in step 330, as the need arises, more links (and their corresponding components) can be brought into an active state. The control program will constantly be monitoring the bandwidth and state of the network to determine how many links are needed in a full power state. In some embodiments, the control program may only periodically monitor the bandwidth and state of the network. The frequency of monitoring is not limiting on the invention.

As noted in FIGS. 2 and 3, the implementation of the 802.3ad protocol could be modified to change the state of a link from a full power, "Selected" state to a low power, "Standby" state, or from a low power, "Standby" state, to a full power, "Selected" state. In other embodiments, other components of the server and switch enclosure can also be put in a low power state when the link is placed in a low power, standby state. For example, the entire NIC card can be put into a low power state. Alternatively, either the NIC controller or the MAC of the NIC card can be put in a low power state. The PHY components of the server and switch can also be placed in a low power mode. In another embodiment, the PCI bus or PCI-express interface can also be put in a low power state. Thus, in one embodiment, all of the components associated with a link can be put in a low power mode to effect high power savings.

One advantage of lowering the power of an under-utilized link aggregation group is the power savings and cost saving in electricity and cooling. The power savings obtained depends upon how long the links are in a low power state, and how many links can be put into a low power state and the amount of logic that can be put to sleep. Ideally, the power savings for an Ethernet Controller (NIC) could be extended from the PHY to the PCIe interface. The NIC would be put into a defined low power state, such as a "standby" state in 802.3ad protocol. In one embodiment, a low power state could include not directing any traffic or power to the link, except to ensure that it remains clock synchronized. In another embodiment, placing a link in a low power state could place it in an idle or standby state, where it is not receiving any communication. The exact specifications of a link in a low power state are not limiting on the invention. The NIC software driver would know how to save the state of the NIC, and have the logic to power it down as well as wake the NIC and re-load its previous state. In one embodiment, the upper layer software bonding or teaming layer from the operating system of the server would request the NIC drivers to put the NIC into the low power state after it had negotiated and re-distributed the load to the remaining active link(s).

Figure 4:
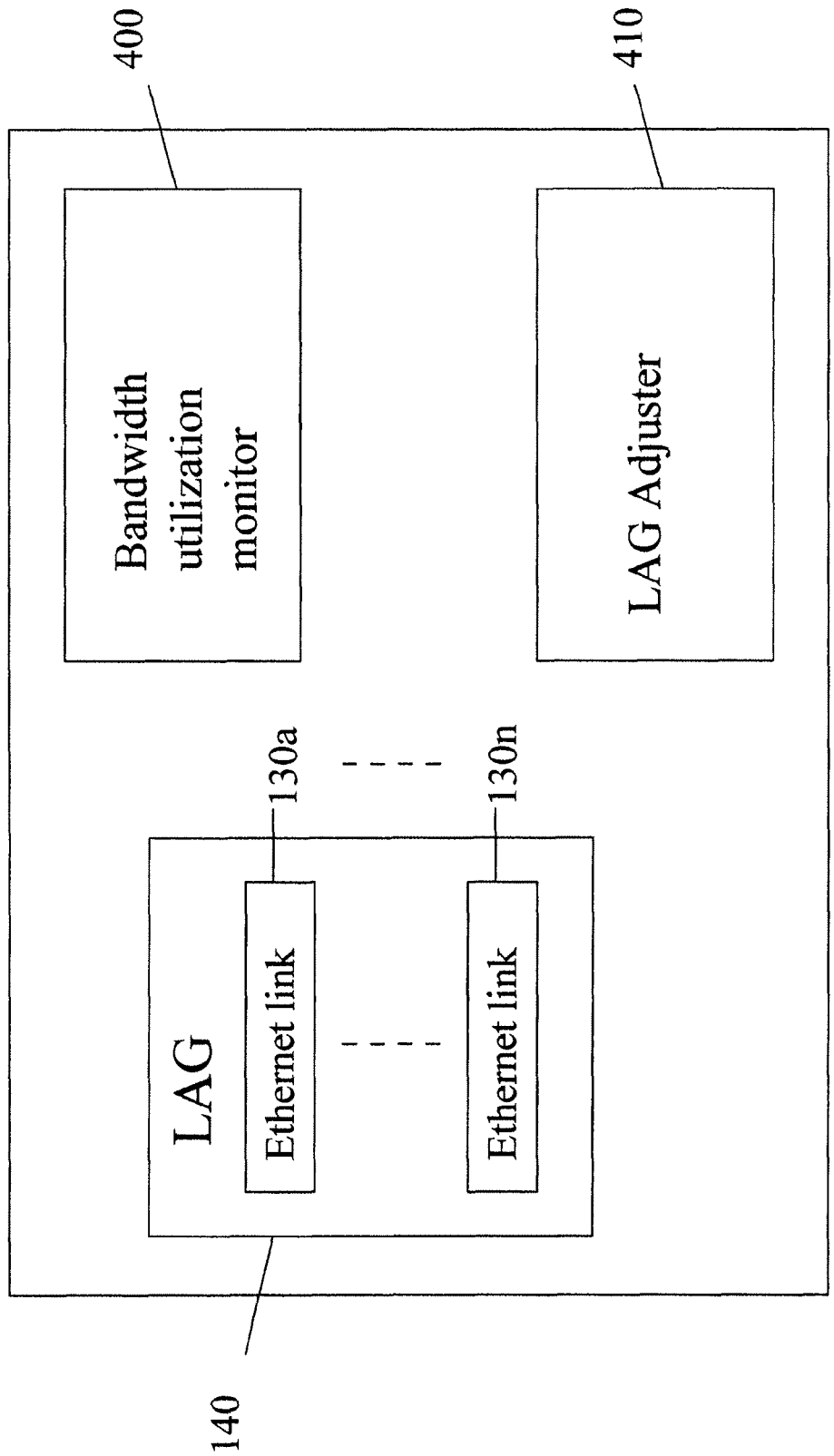
FIG. 4 is a schematic diagram of the invention.

FIG. 4 depicts another embodiment of the invention. Specifically, FIG. 4 depicts a system for conserving power in an Ethernet network. The system includes a Link Aggregation Group 140 that includes at least two Ethernet links 130a-130n, a bandwidth monitor 400 for obtaining bandwidth utilization of the Link Aggregation Group 140, and a LAG adjuster 410 for adjusting the number of Ethernet links 130a-130n in the Link Aggregation Group 140 in a full power state based upon the bandwidth utilization obtained by a bandwidth utilization monitor 400.

Figure 5:
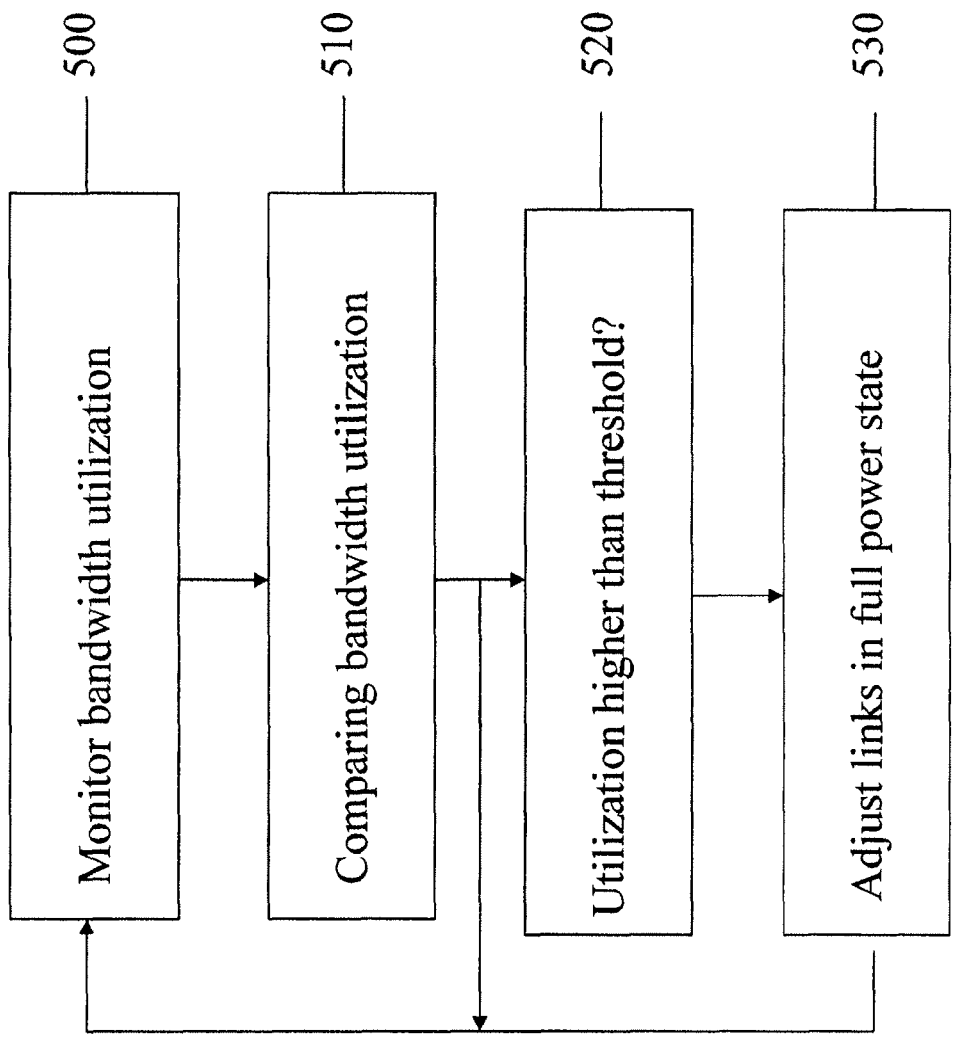
FIG. 5 a flow chart that depicts an embodiment of the invention.

FIG. 5 depicts another embodiment of the invention. Specifically, FIG. 5 depicts a method of conserving power in a Link Aggregation Group. Step 500 corresponds to monitoring bandwidth utilization of the Link Aggregation Group. Step 510 involves comparing bandwidth utilization with available bandwidth. Step 520 relates to determining if bandwidth utilization is higher than a threshold amount. If bandwidth is not higher than a threshold amount, control returns to step 500. If the bandwidth is higher than a threshold amount, step 530 involves adjusting the number of Ethernet links in the Link Aggregation Group in a full power state. Then, control returns to step 500 to continue monitoring bandwidth utilization.

FIG. 6 depicts another embodiment of the invention. Specifically, FIG. 6 shows a system for conserving power in an Ethernet network. The system includes a component 600 for maintaining a Link Aggregation Group that includes at least two Ethernet links, and a component 610 for obtaining bandwidth utilization of the Link Aggregation Group. The system also includes a component 620 for adjusting the number of Ethernet links in the Link Aggregation Group in a full power state based upon the bandwidth utilization obtained by the component 610 for obtaining bandwidth utilization. As detailed throughout the specification, the components 600, 610 and 620 could be embodied by either the switch or the server side components. For example, the component could be part of the firmware, hardware or software of the switch, or the firmware, hardware or software of the server, such as components of the NIC card, or a control program of the switch, to name a few.

In any of the power saving embodiments described above, links could be placed in a low power, such as a "standby" state as defined by an extended LCAP 802.3ad. In another embodiment, the link could be removed from the LAG, or completely powered down. However, it would be preferable to keep a link in a low power state, in order to ensure clock synchronization and also effect a faster return to being in a full power state.

The power saving mechanisms of the invention can be implemented in many different ways. The implementation of power savings is not limiting on the invention. In one embodiment, the server could implement Low Power Link Aggregation Groups in software executed by the server's processor(s), or through a custom driver that runs on the server and modifies the behavior of the existing link aggregation algorithm. The power savings could also be implemented via hardware. On the switch side, in one embodiment, power savings could be implement in hardware, with the configuration and implementation of the algorithm executed by software in the switch.

An exemplary system for implementing the overall system or method or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A system for conserving power in an Ethernet network, comprising:
    a Link Aggregation Group that includes at least two Ethernet links;
    a bandwidth monitor for obtaining bandwidth utilization of the Link Aggregation Group; and
    a LAG adjuster for adjusting a number of Ethernet links in the Link Aggregation Group in a full power state based upon the bandwidth utilization obtained by a bandwidth utilization monitor, wherein the LAG adjuster comprises a state adjuster that places a link from the Link Aggregation Group in a low power state if the bandwidth utilization is lower than a threshold amount.

2. The system of claim 1, wherein the LAG adjuster iteratively adjusts the number of Ethernet links in a full power state, until either all of the remaining Ethernet links operating at full power in the Link Aggregation Group are needed to handle the bandwidth utilization of the Link Aggregation Group, or only one Ethernet link in the Link Aggregation Group is in a full power state.

3. The system of claim 1, further comprising a load balancer which re-balances a traffic load among the Ethernet links in a full power state.

4. The system of claim 1, wherein the LAG adjuster comprises a state adjuster that places an Ethernet link from the Link Aggregation Group in a full power state.

5. The system of claim 1, further comprising a memory that saves the necessary link parameters and registers associated with an Ethernet link when an Ethernet link is placed in a low power state.

6. A method of conserving power in a Link Aggregation Group comprising:
    monitoring bandwidth utilization of the Link Aggregation Group;
    comparing bandwidth utilization with available bandwidth;
    determining if bandwidth utilization is lower than a threshold amount; and
    if bandwidth is lower than a threshold amount,
    adjusting a number of Ethernet links in the Link Aggregation Group in a full power state, wherein adjusting the number of Ethernet links in the Link Aggregation Group comprises placing an Ethernet link from the Link Aggregation Group in a low power state.

7. The method of claim 6, comprising adjusting the number of Ethernet links in the Link Aggregation Group iteratively, until either all of the remaining Ethernet links operating in a full power state in the Link Aggregation Group are needed to handle the bandwidth utilization of the Link Aggregation Group, or only one Ethernet link in the Link Aggregation Group is in a full power state.

8. The method of claim 6, wherein, if bandwidth is higher than a threshold amount, further comprising the step of re-balancing a traffic load among the Ethernet links in a full power state.

9. The method of claim 6, wherein adjusting the number of Ethernet links in the Link Aggregation Group comprises placing an Ethernet link from the Link 25 Aggregation Group in a full power state.

10. The method of claim 6, wherein the threshold amount can be an aggregate bandwidth capacity of all of the Ethernet links in the LAG minus one.

11. The method of claim 6, further comprising the step of saving the necessary link parameters and registers associated with an Ethernet link when an Ethernet link is placed in a low power state.

12. A system for conserving power in an Ethernet network, comprising:
    means for maintaining a Link Aggregation Group that includes at least two Ethernet links;
    means for obtaining bandwidth utilization of the Link Aggregation Group; and
    means for adjusting the number of Ethernet links in the Link Aggregation Group in a full power state based upon the bandwidth utilization obtained by a bandwidth utilization monitor, wherein the means for adjusting the number of Ethernet links in the Link Aggregation Group comprises means for placing an Ethernet link from the Link Aggregation Group in a low power state.

13. The system of claim 12, wherein the means for adjusting iteratively adjusts the number of Ethernet links in a full power state, until either all of the remaining Ethernet links operating at full power in the Link Aggregation Group are needed to handle the bandwidth utilization of the Link Aggregation Group, or only one Ethernet link in the Link Aggregation Group is in a full power state.

14. The system of claim 12, further comprising means for load balancing which re-balances a traffic load among the Ethernet links in a full power state.

15. The system of claim 12, wherein the means for adjusting the number of Ethernet links comprises a state adjuster that places an Ethernet link from the Link Aggregation Group in a full power state.

16. The system of claim 12, further comprising means for saving the necessary link parameters and registers associated with an Ethernet link when an Ethernet link is placed in a low power state.

* * * * *

UNITED STATES PATENT AND TRADEMARK OFFICE
CERTIFICATE OF CORRECTION

PATENT NO. : 8,817,817 B2  
APPLICATION NO. : 12/121523  
DATED : August 26, 2014  
INVENTOR(S) : David J. Koenen et al.

Page 1 of 1

It is certified that error appears in the above-identified patent and that said Letters Patent is hereby corrected as shown below:

In the Claims

In column 8, line 13, in Claim 9, after "Link" delete "25".

Signed and Sealed this  
Third Day of February, 2015

Michelle K. Lee  
*Deputy Director of the United States Patent and Trademark Office*